(12) United States Patent
Cales et al.

(10) Patent No.: US 12,189,271 B2
(45) Date of Patent: Jan. 7, 2025

(54) DEVICE PARTICULARLY FOR DETECTING AND POTENTIALLY IDENTIFYING AT LEAST ONE TARGET INSIDE A DETERMINED VOLUME AND ASSEMBLY COMPRISING SUCH A DEVICE

(71) Applicants: Institut National de Recherche en Informatique et en Automatique, Le Chesnay-Rocquencourt (FR); NAOSTAGE, Nantes (FR)

(72) Inventors: Paul Cales, Nantes (FR); Nathan Van De Hel, Paris (FR); Olivier Le Doeuff, Rennes (FR); Dominique Vaufreydaz, Saint Paul de Varces (FR); Samuel Heidmann, Sainte Helene du Lac (FR); Stanislaw Borkowski, Theys (FR)

(73) Assignees: Institut National de Recherche en Informatique et en Au, Le Chesnay-Rocquencourt (FR); NAOSTAGE, Nantes (FR)

( * ) Notice: Subject to any disclaimer, the term of this patent is extended or adjusted under 35 U.S.C. 154(b) by 0 days.

(21) Appl. No.: 17/909,363

(22) PCT Filed: Mar. 2, 2021

(86) PCT No.: PCT/FR2021/050349
§ 371 (c)(1),
(2) Date: Sep. 3, 2022

(87) PCT Pub. No.: WO2021/176173
PCT Pub. Date: Sep. 10, 2021

(65) Prior Publication Data
US 2024/0007726 A1    Jan. 4, 2024

(30) Foreign Application Priority Data
Mar. 3, 2020  (FR) .................................... 20 02112

(51) Int. Cl.
*H04N 23/51* (2023.01)
*G03B 11/04* (2021.01)
(Continued)

(52) U.S. Cl.
CPC ............ *G03B 11/04* (2013.01); *G03B 17/561* (2013.01); *G06V 10/143* (2022.01);
(Continued)

(58) Field of Classification Search
CPC ........ H04N 7/181; H04N 23/11; H04N 23/45; H04N 23/51; H04N 23/54; G03B 11/04;
(Continued)

(56) References Cited

U.S. PATENT DOCUMENTS 9,185,391 B1    11/2015   Prechtl
9,497,380 B1 *  11/2016   Jannard ................. H04N 23/90
(Continued)

OTHER PUBLICATIONS

International Search Report Dated Apr. 6, 2021.

*Primary Examiner* — Lin Ye
*Assistant Examiner* — Chriss S Yoder, III
(74) *Attorney, Agent, or Firm* — IPSILON USA, LLP

(57) ABSTRACT

Device (1) particularly for detecting and potentially identifying at least one target inside a determined volume (V), the device (1) comprising an image acquisition system (2). The image acquisition system (2) comprises, —at least one infrared camera (3) that is sensitive to waves with a wavelength between 780 and 1400 nm, —a thermal camera (4) that is sensitive to waves between 3000 and 14000 nanometers and —a camera (5), referred to as visible, that is sensitive to waves between 350 and 780 nm. The cameras (3, 4, 5) are mounted on a common support (6) in the form of an elongate, beam-type body. The cameras (3, 4, 5) are arranged on the common support (6), with the fields of view of the cameras (3, 4, 5) having an intersection area (8) that
(Continued)

corresponds to the volume (V) to be observed. The optical axes of the cameras (3, 4, 5) arranged on the common support (6) are not aligned and the distance (D) between the optical centers of at least two of the cameras (3, 4, 5) is between 10 cm and 2 m.

12 Claims, 10 Drawing Sheets

(51) Int. Cl.

| | |
|---|---|
| *G03B 17/56* | (2021.01) |
| *G06V 10/10* | (2022.01) |
| *G06V 10/143* | (2022.01) |
| *G06V 10/147* | (2022.01) |
| *G06V 20/52* | (2022.01) |
| *H04N 23/11* | (2023.01) |

(52) U.S. Cl.
CPC ............ *G06V 10/147* (2022.01); *G06V 20/52* (2022.01); *H04N 23/11* (2023.01); *H04N 23/51* (2023.01); *G06V 10/16* (2022.01)

(58) Field of Classification Search
CPC ...... G03B 15/05; G03B 17/48; G03B 17/561; G03B 19/22; G03B 37/04; G06V 10/143; G06V 10/147; G06V 10/16; G06V 20/52; G08B 13/19632; G08B 13/19641
See application file for complete search history.

(56) References Cited

U.S. PATENT DOCUMENTS

| | | | |
|---|---|---|---|
| 10,264,165 B2 * | 4/2019 | Franz | ...................... H04N 23/90 |
| 2014/0139643 A1 * | 5/2014 | Hogasten | .......... H01L 27/14623 |
| | | | 348/48 |
| 2019/0095721 A1 * | 3/2019 | Ion | ....................... G06V 10/141 |

* cited by examiner

DEVICE PARTICULARLY FOR DETECTING AND POTENTIALLY IDENTIFYING AT LEAST ONE TARGET INSIDE A DETERMINED VOLUME AND ASSEMBLY COMPRISING SUCH A DEVICE

RELATED APPLICATION

This application is a National Phase of PCT/FR2021/050349 filed on Mar. 2, 2021, which claims the benefit of priority from French Patent Application No. 20 02112, filed on Mar. 3, 2020, the entirety of which are incorporated by reference.

FIELD OF THE INVENTION

The present invention relates to a device notably for detecting and possibly identifying at least one target inside a determined volume, and also to an assembly comprising such a device.

It relates in particular to a device notably for detecting and possibly identifying at least one target inside a determined volume, said device comprising an image acquisition system.

BACKGROUND

In many fields and in particular in that of entertainment, monitoring and tracking devices have been developed to permit in particular the tracking of the movement of the people occupying the stage. These monitoring and tracking devices incorporate an image acquisition system whose images are processed. These real-time, continuous monitoring and tracking devices can be coupled with lighting, video and sound control systems to enable real-time audiovisual effects on the basis of the position and movements of people on stage. However, the current design of monitoring and tracking devices requires the people to be tracked to wear a box equipped with an identification system, such as light-emitting diodes or a chip. Furthermore, imaging devices are known as illustrated by documents US 2014/0139643 and U.S. Pat. No. 9,185,391. However, such devices do not allow the tracking of a target.

OBJECTS AND SUMMARY

An object of the invention is to propose a device notably for detecting and possibly identifying at least one target of the aforementioned type, the design of said device making it possible to dispense with the fitting of an identification box on the targets to be followed without compromising the ease of mounting of the device.

To this end, a subject of the invention is a device notably for detecting and possibly identifying at least one target inside a determined volume, said device comprising an image acquisition system, characterized in that the image acquisition system comprises, at least one infrared camera sensitive to waves whose wavelength is between 780 and 1400 nm,
a thermal camera sensitive to waves between 3000 and 14000 nm and
a camera, referred to as visible camera, sensitive to waves between 350 and 780 nm, in that said cameras are mounted on a common support in the form of an elongated beam-like body, in that the cameras are disposed on the common support with the fields of vision of said cameras having an intersection zone corresponding to the volume to be observed, in that the optical axes of said cameras disposed on the common support are distinct, and in that the distance between the optical axes of at least two of the cameras is between 10 cm and 2 m. The combination of 3 types of cameras and their positioning on a common support making it possible to mount the device in a simple and rapid manner and also to acquire raw data sufficient to enable, after processing of said data, detection of at least one moving target, in particular in terms of movement and position and therefore tracking thereof even in difficult lighting conditions.

According to one embodiment of the invention, the common support is portable and is provided with at least one attachment member. The implementation of a common support which is externally in the form of an elongated beam-type body facilitates the gripping of the device and the carrying thereof. The presence of one or more attachment members allows easy mounting of the device above a stage. The device can be easily raised above a stage due to the portable nature of the device.

According to one embodiment of the invention, the common support comprises a support base for receiving the cameras, a sleeve-type casing inside which the support base is configured to be at least partially inserted, said sleeve casing being provided with openings, at least some of the openings extending at the level of the optics of the cameras disposed on the support base in the state in which the support base is inserted in said sleeve casing. This design allows easy maintenance of the device while still ensuring good protection of the sensitive components of the device, in particular during the transport, storage and installation phases of the device.

According to one embodiment of the invention, the device comprises, for at least one of the cameras, at least one cover for protecting the optic of said camera, said cover being mounted so as to slide along an axis parallel to the longitudinal axis of the elongated common support for movement of the part, referred to as active part, of said cover between an active position for protecting the optic of the camera, in which the active part of the cover extends at least partially facing said optic of the camera, and an inactive position, in which the optic of the camera is non-masked. The cover is preferably positioned inside the sleeve casing, between the support base and the sleeve casing, in order to be able to be protected as well as possible from damage. The cover can be manually driven in sliding movement. In a variant, the device may comprise a control system for driving the movement of the or of at least one of the covers.

According to one embodiment of the invention, the active part of the cover is provided internally, on the surface side of the cover facing the optics in the active position of said active part of the cover, with a shield mounted so as to be able to move in the direction closer to or away from the active part of the cover, said shield forming, in a position moved away from the cover and in the active position of the cover, a chamber capping at least the optic of the camera, this chamber interposed between the cover and the optic of the camera isolating the optic of the camera from the cover. The presence of what is known as a sealed chamber, sealed in particular in relation to dust, makes it possible to protect the optics of the cameras during the phases of non-use of the cameras. This thus results in dual protection, namely both protection of the camera optics from contact with external objects which may damage them during installation/removal of the device and during transport thereof, and protection against dust which may be deposited on the optics.

According to one embodiment of the invention, the or at least one of the covers has the shape of a U with the core of the U forming the active part of the cover, and, for its movement between a position moved away from the cover and a position close thereto, the shield is equipped with guide members, one or some being in engagement with at least one guide path provided on the cover, the other or others being in engagement with at least one guide path provided on the common support. Thus, the sliding movement of the cover from the inactive position to the active position permits, in parallel, the passage of the shield from the position close to the cover to the position moved away from the cover.

According to one embodiment of the invention, the viewing angle of each camera is less than 90°. This results in an optimization of the spatial precision of each camera.

According to one embodiment of the invention, the or one of the visible cameras is disposed on the common support at least between a thermal camera and an infrared camera.

According to one embodiment of the invention, the infrared cameras are at least two in number, as are the thermal cameras. This disposition can permit an optimized perception of the stage. Preferably, the cameras are disposed on the support so as to form, from one end to the other end of the elongated support, a succession of cameras comprising at least one thermal camera, an infrared camera, a visible camera, a thermal camera and an infrared camera.

According to one embodiment of the invention, in addition to the cameras, the common support bears at least one emitter of light not visible to the naked eye. This configuration improves the perception of the infrared cameras. In particular, the or each infrared light emitter, such as light-emitting diodes, preferably emits within a range of wavelengths between 780 and 1400 nm so that the infrared camera or cameras can detect said light.

According to one embodiment of the invention, the optical axes of the cameras are parallel and/or the viewing angles of the cameras are identical from one camera to another. This results in a simplification of the mathematical processing of the raw data from the cameras to allow in particular a 3D reconstruction of the stage and a possibility of minimizing the number of cameras.

According to one embodiment of the invention, the device comprises at least one communication system configured to allow the cameras of the image acquisition system to communicate with at least one data transmitter and/or receiver system. The communication system is therefore configured to address control data for said cameras from a transmitter system comprising a camera control unit to the cameras, and to transfer the raw or possibly pre-processed data from the cameras to a receiver system, this receiver system possibly being common or distinct from the transmitter system.

Another subject of the invention is an assembly comprising at least one data transmitter and/or receiver system and a device notably for detecting and possibly identifying at least one target inside a determined volume, characterized in that the device is of the aforementioned type, and the or at least one of the data transmitter and/or receiver systems and the cameras of the acquisition system are configured to communicate with each other.

According to one embodiment of said assembly, the or at least one of the data transmitter and/or receiver systems of said assembly comprises a camera control unit configured to control what is known as simultaneous image capture by the cameras with a phase shift or time offset in the acquisition of images between two cameras at most equal to 5 milliseconds.

BRIEF DESCRIPTION OF THE DRAWINGS

The invention will be better understood on reading the following description of exemplary embodiments, with reference to the appended drawings, in which.

DETAILED DESCRIPTION

Figure 1:
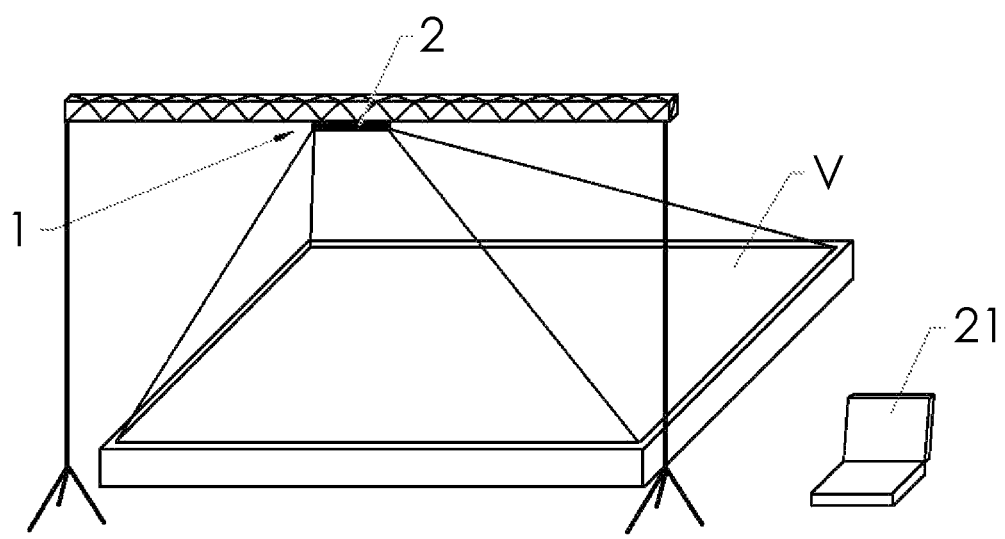
FIG. 1 shows a schematic view of an assembly according to the invention.

As mentioned above, a subject of the invention is a device 1 notably for detecting, and possibly identifying, at least one moving or immobile target within a determined volume V corresponding, in the example shown in FIG. 1, to a performance stage. Obviously, this determined volume V can be a volume other than a performance stage, without departing from the scope of the invention.

The target or targets to be detected can be living beings, such as performers or animals moving inside the volume V.

The device 1 which is the subject of the invention therefore comprises an image acquisition system 2 forming a set of raw data which can be addressed in real time, directly or after pre-processing, to a data receiver system 21, such as a server and/or a dedicated computer which, after processing, can address the result of the data processing to third-party sound and/or light and/or video management systems, in a manner known per se. The details of the data processing will not be described below.

The function of the device 1 which is the subject of the invention is the acquisition of image data under good conditions to allow optimal processing thereof.

The device 1 has to be positioned in such a way as to allow an unobstructed view of the stage. Thus, generally and as illustrated in FIG. 1, the device 1 is generally disposed along one of the upper edges of the parallelepiped delimiting the stage.

Thus, the device 1 is disposed high up, at the front of the stage, and is directed toward the stage to have an overall view of the stage. In the example shown, the stage can have a dimension of 10 meters×10 meters×10 meters. Obviously, in the case of a very large stage, several devices 1 can be provided.

The image acquisition system 2 comprises at least three types of cameras, namely at least one infrared camera 3 also called "NIR camera" or "near infrared", this infrared camera 3 being sensitive to waves whose wavelength is between 780 and 1400 nanometers, at least one thermal camera 4 sensitive to waves between 3 and 14 micrometers and at least one camera 5, referred to as visible camera, sensitive to waves between 350 and 780 nanometers. These different cameras 3, 4, 5 are fixedly mounted on a common support 6, such that the relative position of the different cameras is known.

Figure 4:
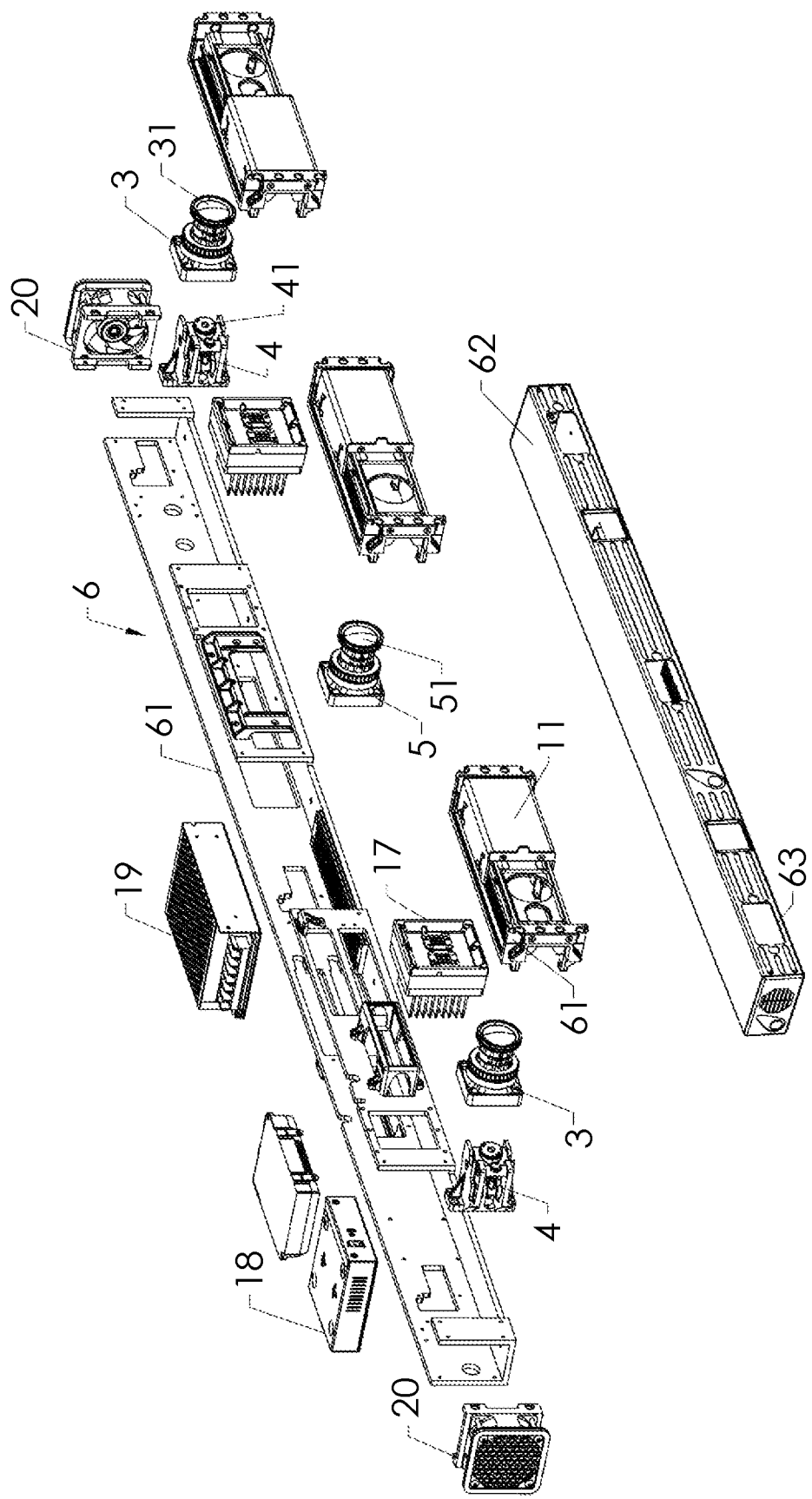
FIG. 4 shows an exploded view of the elements of the device according to the invention.
Figure 5:
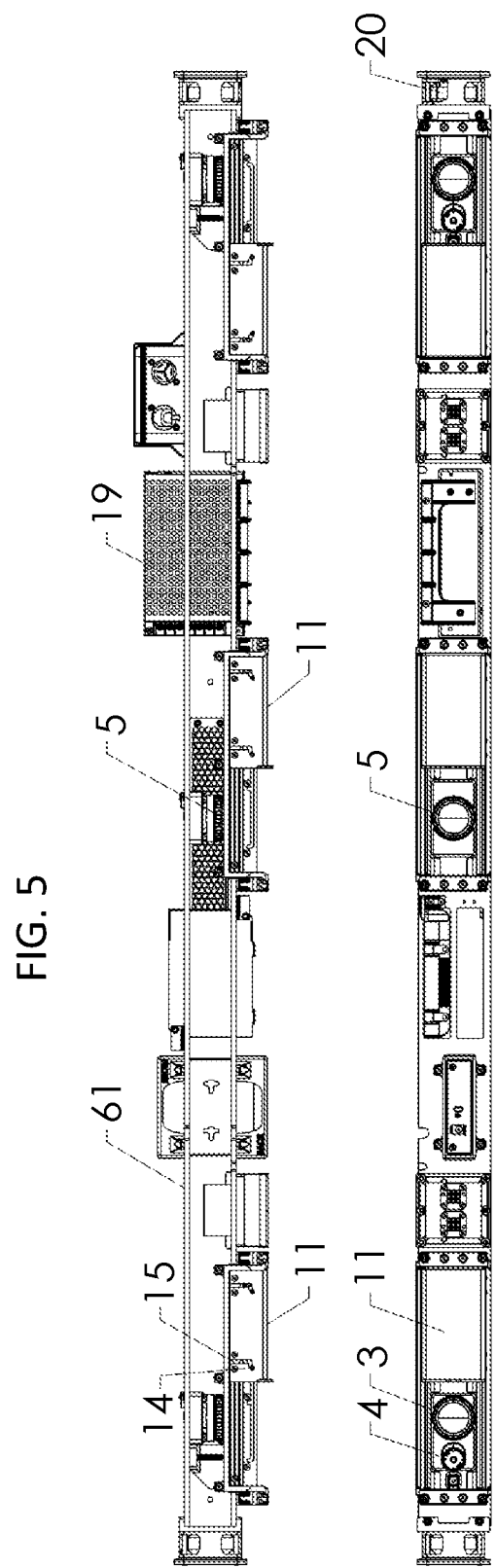
FIG. 5 shows a top view and a front view of the support base.
Figure 6:
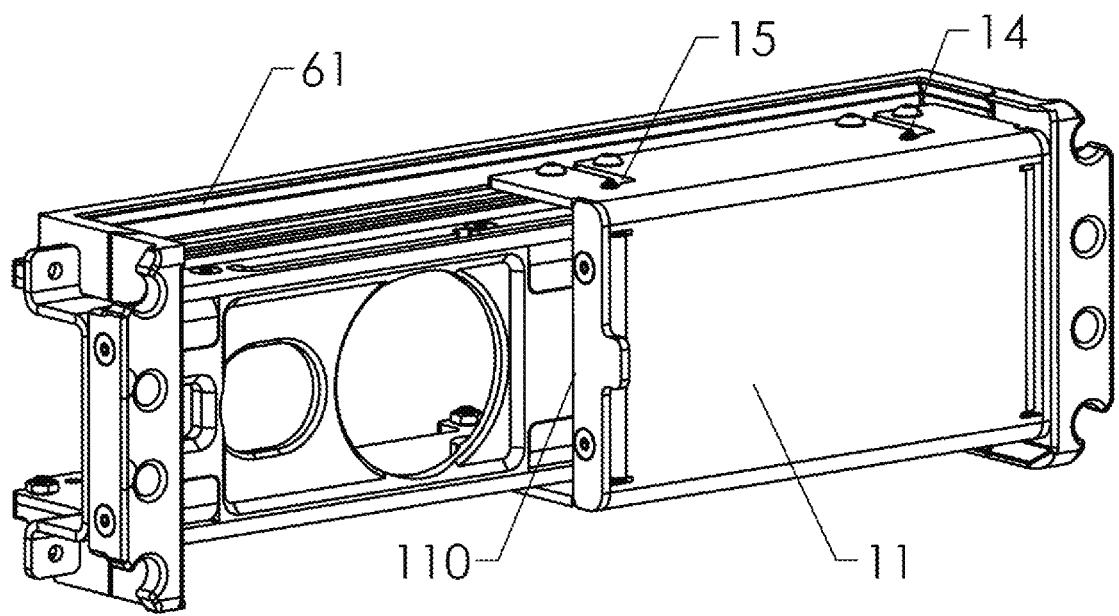
FIG. 6 shows a partial perspective view of a part of the support base equipped with a protective cover in the inactive position of said cover.
Figure 7:
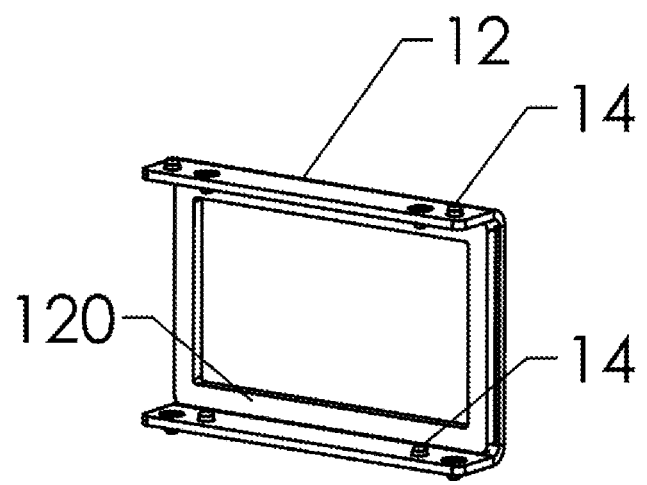
FIG. 7 shows a perspective view of a shield.
Figure 8:
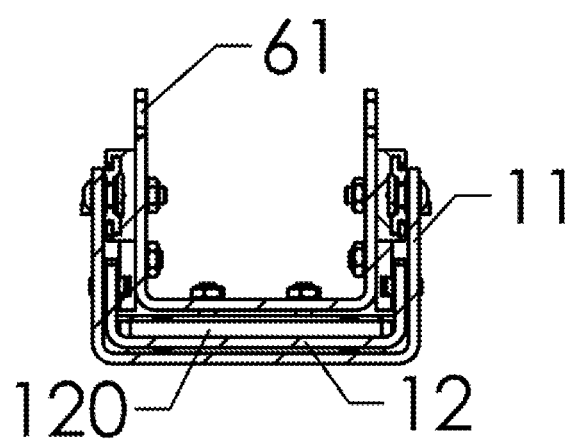
FIG. 8 shows a view in section of the support base taken at the level of the protective cover.
Figure 9:
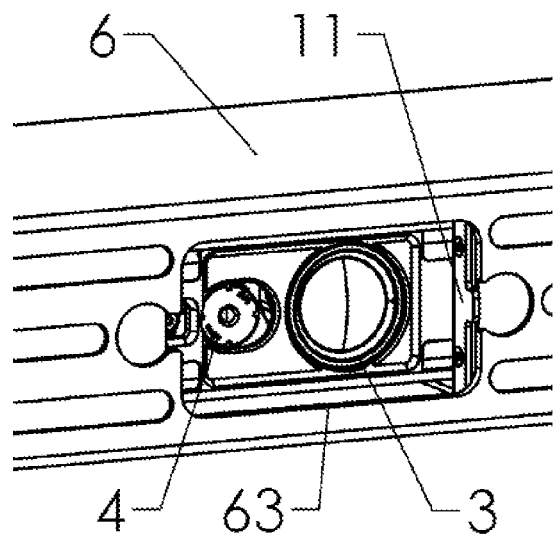
FIG. 9 shows a partial perspective view of the common support taken at the level of a protective shield, said protective shield being in the inactive position.

This common support 6 is externally in the form of an elongated beam-type body. Generally, and as illustrated in FIG. 4, the common support 6 comprises a support base 61 for receiving the cameras which is in the form of an elongated body. This elongated body here has a U-shaped cross section. This elongated body can be made in one or multiple parts. The common support 6 also comprises a sleeve-type casing 62 inside which the support base 61 is configured to be at least partially inserted. This casing 62 is in the form of an elongated hollow body of parallelepipedal shape, this hollow body being provided, along one of its faces, with openings 63 axially offset along said body.

These openings 63 of the casing 62 extend facing openings formed in one of the faces of the support base 61.

These openings 63 extend at the level of the optics of the cameras 3, 4 and 5 disposed on the support base 61 in the state in which the support base 61 is inserted in said sleeve casing 62.

The casing 62 has a length, preferably of between 1.20 meters and 1.80 meters, a width of between 10 and 20 centimeters and a height of between 8 and 12 centimeters. The total weight of the common support 6 after receiving all the elements that it has to support is preferably between 10 and 20 kilos. In the example shown, the common support 6 has exterior length×width×height dimensions of 1450 mm×150 mm×88 mm, and the weight is 15 kilos. The common support 6 is therefore a portable support.

To facilitate its installation, the common support 6 comprises one or more attachment members 10. In this case, these attachment members 10 have the form of hooks disposed on the casing. Anchor points to which slings can be fixed are also provided on said casing 62.

Each camera 3, 4, 5 obviously comprises an optic which can also be called a lens. This optic is shown by 31 for an infrared camera 3, by 41 for a thermal camera 4 and by 51 for a visible camera 5.

Each camera 3, 4, 5 comprises an optical axis shown by 9 in the figures, a field of vision or viewing angle shown by 7 in the figures. Each camera 3, 4, 5 further comprises an optical center.

Figure 2:
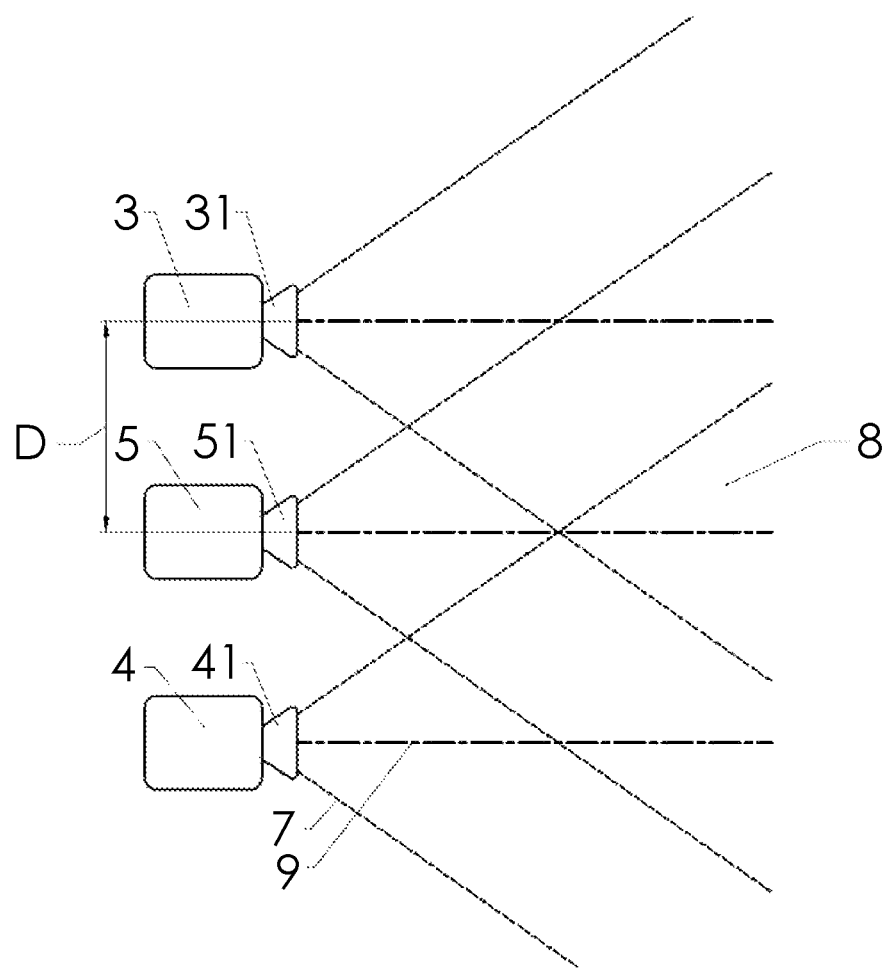
FIG. 2 shows a schematic view of the disposition of the cameras on the common support to materialize the zone of intersection of the viewing angles of said cameras corresponding to the volume to be observed.
Figure 3:
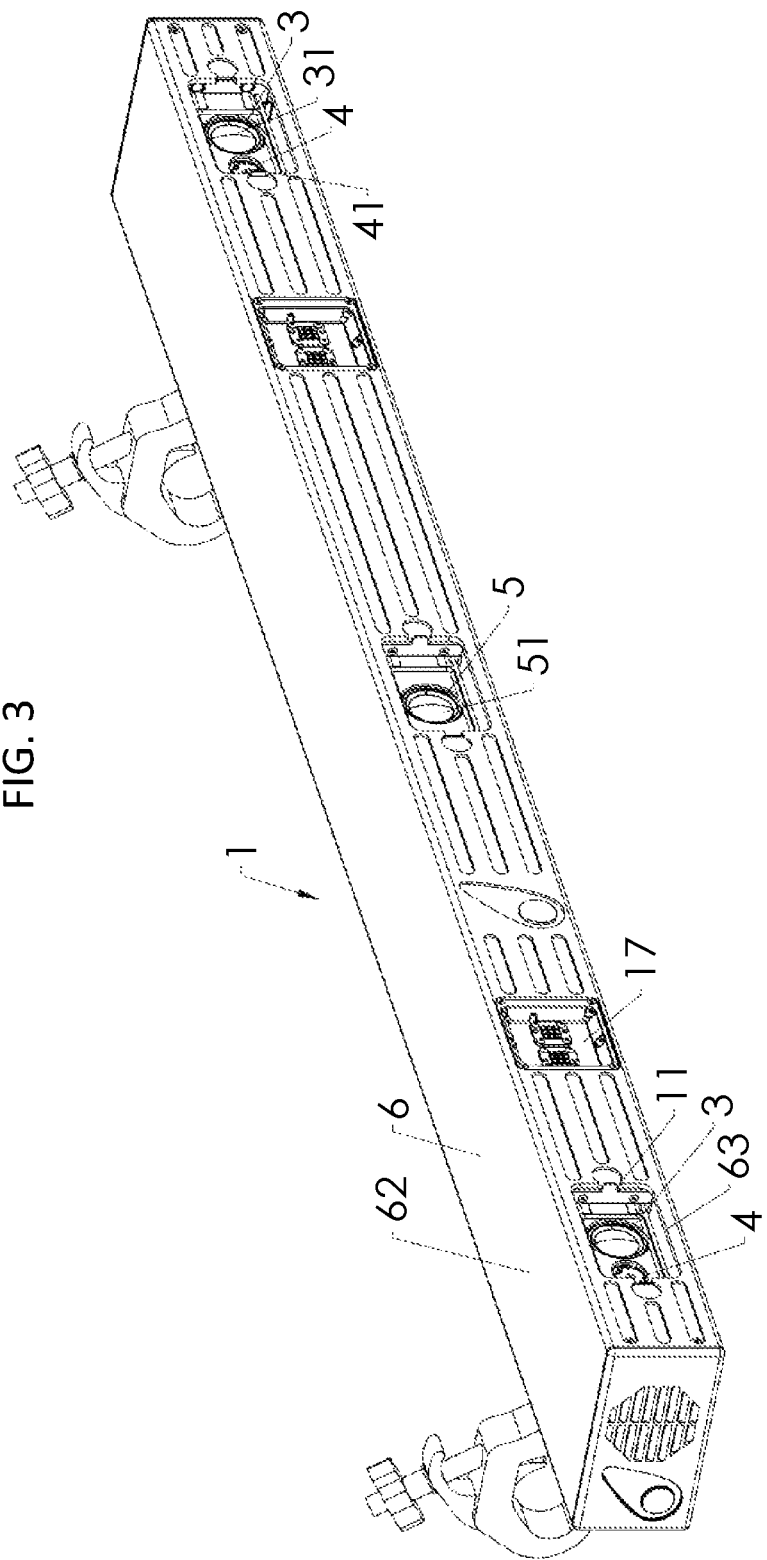
FIG. 3 shows a perspective view of a device according to the invention.

In a manner which is characteristic of the invention, the cameras 3, 4, 5 are disposed on the common support 6 with the viewing angles of said cameras having an intersection zone 8 corresponding to the volume V to be observed, as illustrated in FIG. 2.

The optical axes of said cameras 3, 4, 5 disposed on the common support 6 are distinct, and the distance D between the optical axes of at least two of the cameras 3, 4, 5 is between 10 centimeters and 2 meters.

In the examples shown, the viewing angle of each camera 3, 4, 5 is less than the optical axes of the cameras 3, 4, 5 are parallel and the viewing angles of the cameras 3, 4, 5 are identical from one camera to another.

The infrared cameras 3 are two in number, as are the thermal cameras 4. The visible camera 5 is disposed on the common support 6 between a thermal camera 4 and an infrared camera 3. In particular, the cameras are disposed on the common support 6 so as to form, from one end to the other end of the elongated support 6, a succession of cameras comprising at least one thermal camera, an infrared camera, a visible camera, a thermal camera and an infrared camera.

To supply said cameras with power, a low-voltage power supply unit 19 is embedded in the support base 61.

In addition to the cameras 3, 4, 5, the common support 6 bears at least one emitter 17 of light not visible to the naked eye.

In the examples shown, the light emitters 17 which are two in number are infrared projectors of the LED type, which preferably emit within a range of wavelengths between 780 and 1400 nm so that the infrared camera or cameras 3 can detect said light. These light emitters 17 are disposed on the support base 61, on either side of the visible camera 5, between the visible camera 5 and one of the infrared cameras for one of the light emitters 17, and between the visible camera 5 and a thermal camera for the other of the light emitters.

Again, these light emitters 17 are disposed facing an opening 63 of the casing 62 and an opening of the support base 61 and are oriented so as to illuminate the volume V to be observed.

A power supply unit for these light emitters 17 is provided.

Each end of the support base 61 is equipped with a fan 20.

To improve the assembly, the device 1 comprises, for at least one of the cameras, at least one cover 11 for protecting the optic of said camera, said cover being mounted so as to slide along an axis parallel to the longitudinal axis of the elongated common support 6 for movement of the part 110, referred to as active part, of the cover 11 between an active position for protecting the optic of the camera, in which the active part of the cover extends at least partially facing said optic of the camera, and an inactive position, in which the optic of the camera is non-masked.

The active part 110 of the cover 11 is provided internally, on the surface side of the cover 11 facing the optics in the active position of said active part 110 of the cover 11, with a shield 12 mounted so as to be able to move in the direction closer to or away from the active part 110 of the cover 11. The shield 12 forms, in the position moved away from the cover 11 and in the active position of the cover 11, in which the active part of the cover extends at least partially facing said optic of the camera, a chamber 13 capping at least the optic of the camera.

This chamber 13 interposed between the cover and the optic of the camera isolates the optic of the camera from the cover 11.

This chamber 13, said to be closed in a dust-tight manner, makes it possible to avoid the deposition of dust on the optics of the camera or cameras facing said shield 12.

In the examples shown, the device comprises three covers 11, namely a first cover for the visible camera 5 and two other covers each serving to protect a pair of cameras formed by a thermal camera and by an infrared camera.

Each cover 11 has the shape of a U with the core of the U forming the active part 110 of the cover 11. Each cover 11 is disposed inside the casing 62 of the common support 6, between the casing 62 and the support base 61.

That part of the support base 61 on which the cover 11 and the shield 12 slide is produced in the form of a block mounted on the rest of the support base 61 in a removable manner. This mounting allows easy maintenance of the covers and shields.

At least one, preferably each of the covers 11 is, for its sliding movement, actuable either manually or using a remotely controllable movement driving device. This movement driving device can be formed by a motorized worm screw or by a belt-type or chain-type motorized movement transmission device to which the covers are coupled.

The core of the U is internally bordered by a foam frame 120. This frame 120 is pressed against the part of the support base 61 surrounding the optics of the cameras to be protected by a shield 12 in the position in which the shield 12 is moved away from the cover 11 and in the active position of the cover 11. This foam frame provides insulation in relation to dust for the chamber 13 described above.

The shield 12, similarly to the cover 11, has the form of a U-shaped part. Each arm of the U of the component part of the shield 12 is provided with guide members 14 produced here in the form of pins. Some of these guide members 14 are disposed inside the U on the arms of the U so as to come into engagement with a guide path 16, such as a slot, provided on the common support 6, in particular on a face of the support base 61 adjoining the face of the support base 61 provided with openings for the optics of the cameras.

Others of these guide members 14 are disposed inside the U on the arms of the U so as to come into engagement with a guide path 15 provided in the cover 11.

Figure 10:
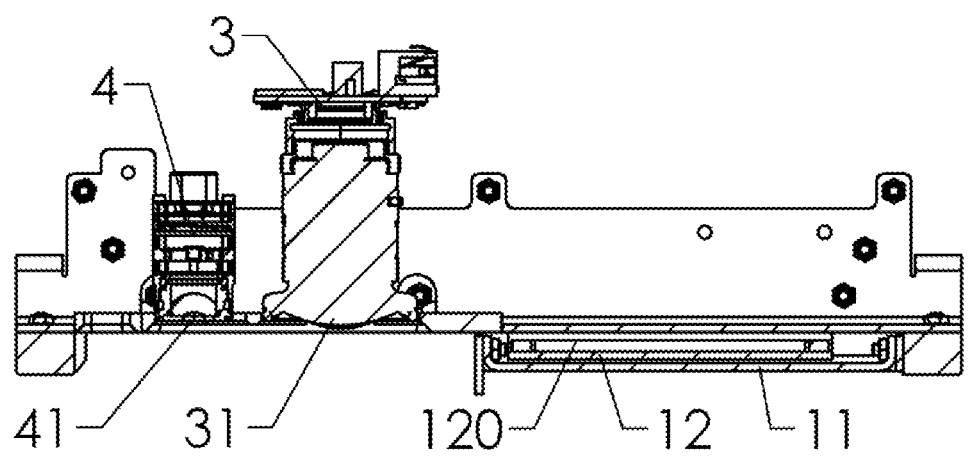
FIG. 10 shows a partial view in section of the support base taken at the level of a protective shield, said protective shield being in the inactive position.
Figure 11:
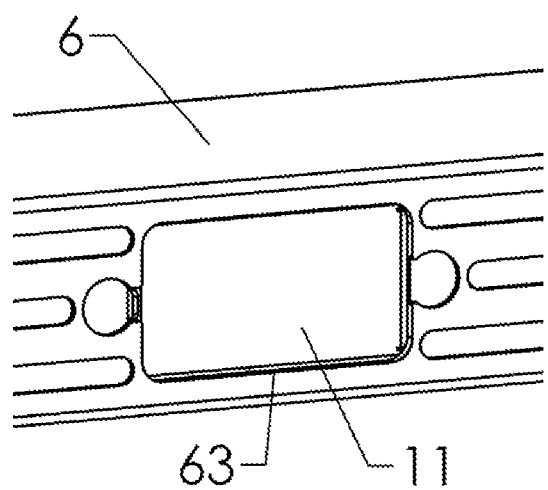
FIG. 11 shows a partial perspective view of the common support taken at the level of a protective shield, said protective shield being in the active position.
Figure 12:
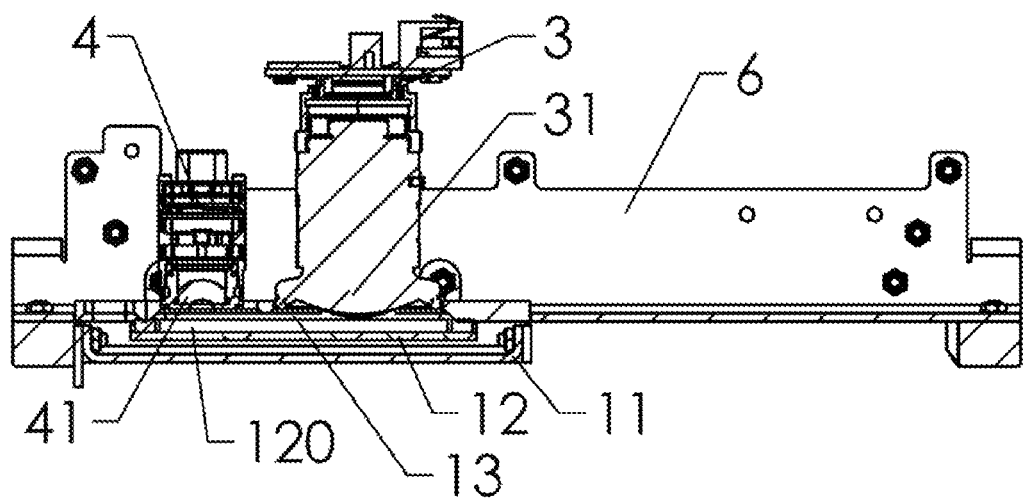
FIG. 12 shows a partial view in section of the support base taken at the level of a protective shield, said protective shield being in the active position.
Figure 13:
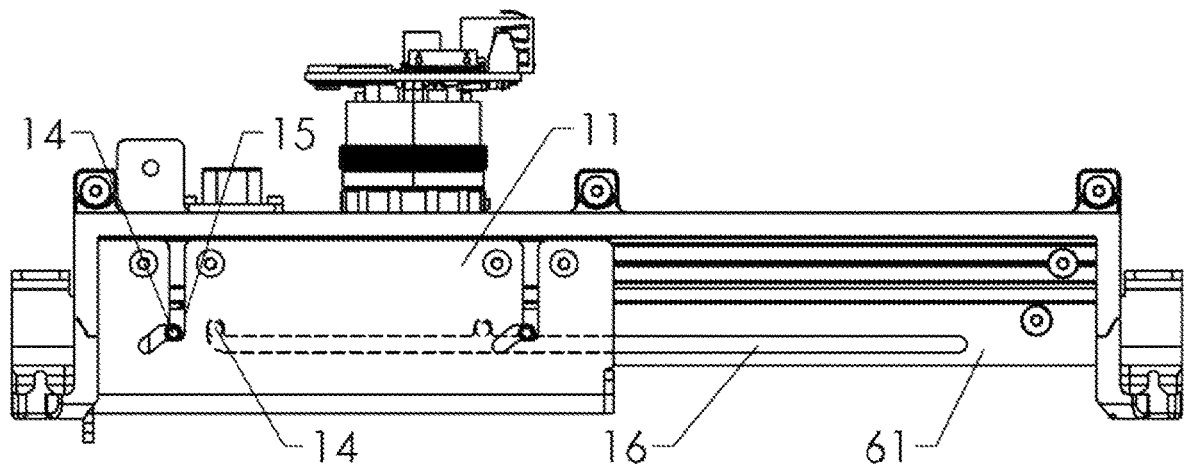
FIG. 13 shows a partial view in section of the support base taken at the level of a protective shield in the active position of the protective shield.
Figure 14:
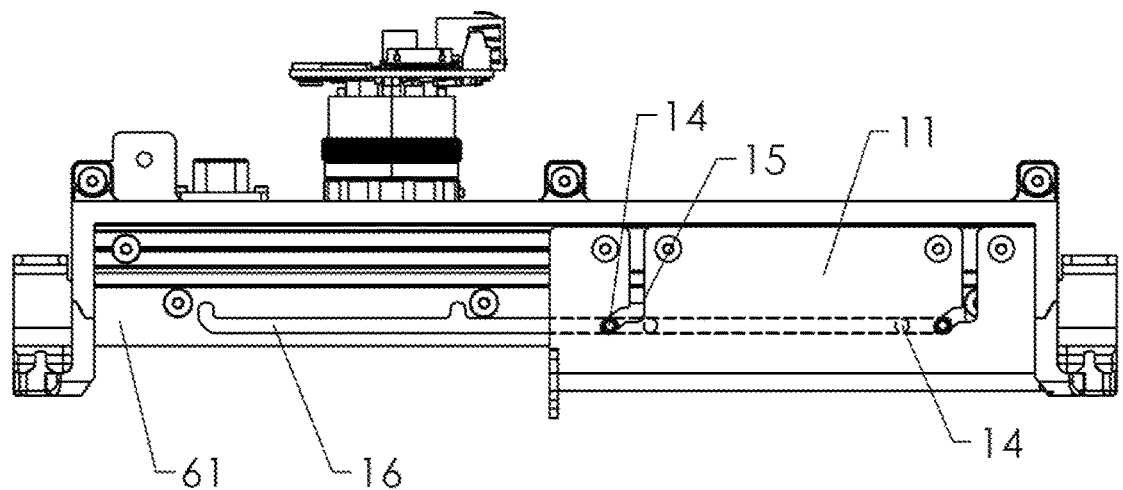
FIG. 14 shows a partial view in section of the support base taken at the level of a protective shield in the inactive position of the protective shield.

The guide paths 15 and 16 are configured, that is to say shaped and dimensioned, to permit, in parallel with the passage of the protective cover 11 from the inactive position to the active position, the passage of the shield 12 from the position close to the protective cover 11 to a position moved away from the protective cover 11. This movement is illustrated by FIGS. 10 and 12.

To improve the device 1, the device comprises at least one communication system 18 configured to allow the cameras of the image acquisition system 2 to communicate with at least one remote data transmitter and/or receiver system 21.

In the examples shown, this communication system 18 comprises an Ethernet switch embedded in the support base 61.

This communication system 18 can in particular transfer the raw or pre-processed data from each camera to a data receiver system, such as a server or a dedicated computer. This receiver system makes it possible to calibrate the network of cameras such that each camera is precisely positioned in the absolute 3D environment and to process the data in order to detect the targets and address the positions of these targets to audiovisual systems.

This data receiver system is generally also a data transmitter system which comprises a control unit for the cameras and all the components equipping the common support 6, such as the light emitters.

Preferably, the control unit is configured to control what is known as simultaneous image capture by the cameras with a phase shift or time offset in the acquisition of images between two cameras at most equal to 5 milliseconds. This control unit is in the form of an electronic computer system which comprises, for example, a microprocessor and a working memory. When it is specified that the unit is configured to carry out an operation, this means that the unit comprises computer instructions and the corresponding means of execution which make it possible to carry out said operation and/or that the unit comprises corresponding electronic components.

At least the thermal cameras and the infrared cameras are configured to operate in stereovision.

The details of the data transmitters and/or receivers will not be provided below, as they are well known to those skilled in this art.

By virtue of the design of the device as described above, it is possible, in an easy manner, to install such a device above a stage and to detect the targets on the stage without having to pre-equip said targets with any detection system.

The invention claimed is:

1. A device for detecting and possibly identifying at least one target inside a determined volume, said device comprising an image acquisition system having,
    at least one infrared camera sensitive to waves whose wavelength is between 780 and 1400 nm,
    a thermal camera sensitive to waves between 3000 and 14000 nanometers and
    a visible camera, sensitive to waves between 350 and 780 nm, in that said cameras are mounted on a common support in the form of an elongated beam-like body, in that the cameras are disposed on the common support with the fields of vision of said cameras having an intersection zone corresponding to the volume to be observed, in that the optical axes of said cameras disposed on the common support are distinct, and in that the distance between the optical axes of at least two of the cameras is between 10 cm and 2 m,
    wherein the device comprises, for at least one of the cameras, at least one cover for protecting the optic of said camera, said cover being mounted so as to slide along an axis parallel to the longitudinal axis of the elongated common support for movement of the part, referred to as active part, of said cover between an active position for protecting the optic of the camera, in which the active part of the cover extends at least partially facing said optic of the camera, and an inactive position, in which the optic of the camera is non-masked.

2. The device as claimed in claim 1, wherein the common support is portable and is provided with at least one attachment member.

3. The device according to claim 1, wherein the common support comprises a support base for receiving the cameras, a sleeve-type casing inside which the support base is configured to be at least partially inserted, said sleeve casing being provided with openings, at least some of the openings extending at the level of the optics of the cameras disposed on the support base in the state in which the support base is inserted in said sleeve casing.

4. The device as claimed in claim 1, wherein the active part of the cover is provided internally, on the surface side of the cover facing the optics in the active position of said active part of the cover, with a shield mounted so as to be able to move in the direction closer to or away from the active part of the cover, said shield forming, in a position moved away from the cover and in the active position of the cover, a chamber capping at least the optic of the camera, this chamber interposed between the cover and the optic of the camera isolating the optic of the camera from the cover.

5. The device as claimed in claim 4, wherein the at least one of the covers has the shape of a U with the core of the U forming the active part of the cover, and in that, for its movement between a position moved away from the cover and a position close thereto, the shield is equipped with guide members, one or some being in engagement with at least one guide path provided on the cover, the other or others being in engagement with at least one guide path provided on the common support.

6. The device as claimed in claim 1, wherein the viewing angle of each camera is less than 90°.

7. The device as claimed in claim 1, wherein the one of the visible cameras is disposed on the common support at least between a thermal camera and an infrared camera.

8. The device as claimed in claim 1, wherein the infrared cameras are at least two in number, and wherein there are two thermal cameras.

9. The device as claimed in claim 1, wherein, in addition to the cameras, the common support bears at least one emitter of light not visible to the naked eye.

10. The device as claimed in claim 1, wherein the optical axes of the cameras are parallel and/or the viewing angles of the cameras are identical from one camera to another.

11. The device as claimed in claim 1, wherein said device further comprises at least one communication system configured to allow the cameras of the image acquisition system to communicate with at least one data transmitter and/or receiver system.

12. An assembly comprising:
at least one data transmitter and/or receiver system; and
a device for detecting and identifying at least one target inside a determined volume,
wherein the device is in accordance with claim 1, and in that the at least one of the data transmitter and/or receiver systems and the cameras of the acquisition system are configured to communicate with each other.

* * * * *